United States Patent
Pilz et al.

(10) Patent No.: US 11,424,668 B2
(45) Date of Patent: Aug. 23, 2022

(54) ROTOR HAVING SEGMENTS WITH ROTATIONALLY OFFSET MAGNETIC POLES

(71) Applicant: Bayerische Motoren Werke Aktiengesellschaft, Munich (DE)

(72) Inventors: Maximilian Pilz, Munich (DE); Benjamin Schlaepfer, Munich (DE); Juntao Zhu, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 59 days.

(21) Appl. No.: 16/978,946

(22) PCT Filed: Sep. 18, 2019

(86) PCT No.: PCT/EP2019/074971
§ 371 (c)(1),
(2) Date: Sep. 8, 2020

(87) PCT Pub. No.: WO2020/083571
PCT Pub. Date: Apr. 30, 2020

(65) Prior Publication Data
US 2020/0412218 A1     Dec. 31, 2020

(30) Foreign Application Priority Data

Oct. 25, 2018    (DE) .................. 10 2018 126 570.0

(51) Int. Cl.
*H02K 29/03*      (2006.01)
*H02K 1/274*      (2022.01)

(52) U.S. Cl.
CPC ............. *H02K 29/03* (2013.01); *H02K 1/274* (2013.01); *H02K 2201/06* (2013.01)

(58) Field of Classification Search
None
See application file for complete search history.

(56) References Cited

U.S. PATENT DOCUMENTS

| 8,134,273 B2 | 3/2012 | Vollmer et al. |
| 2005/0017589 A1 | 1/2005 | Ionel et al. |

(Continued)

FOREIGN PATENT DOCUMENTS

| DE | 10 2012 205 191 A1 | 10/2013 |
| DE | 10 2014 017 304 A1 | 5/2016 |

(Continued)

OTHER PUBLICATIONS

Machine Translation of EP 2451049 A1 (Year: 2012).*

(Continued)

*Primary Examiner* — Thomas Truong
(74) *Attorney, Agent, or Firm* — Crowell & Moring LLP

(57) ABSTRACT

A rotor of an electric machine has multiple segments arranged adjacent to one another in an axial direction, wherein each of the segments has multiple magnetic poles which are arranged coaxially with respect to an axis of rotation of the electric machine and so as to be evenly distributed in a circumferential direction of the segment. The segments are arranged in the circumferential direction such that the magnetic poles of adjacent segments which are adjacent to one or more middle segments are rotationally offset in a first angular direction in relation to the magnetic poles of the one or more middle segments. The magnetic poles of segments which adjoin the adjacent segments toward the outside are rotationally offset in a second angular direction which is opposite to the first angular direction.

12 Claims, 3 Drawing Sheets

(56) References Cited

U.S. PATENT DOCUMENTS

| | | |
|---|---|---|
| 2006/0163969 A1 | 7/2006 | Nemoto et al. |
| 2013/0169097 A1* | 7/2013 | Saban ............... H02K 1/16 |
| | | 310/156.08 |
| 2013/0169099 A1 | 7/2013 | Saban et al. |
| 2015/0015107 A1 | 1/2015 | Blum et al. |
| 2015/0270750 A1* | 9/2015 | Totoki ............... H02K 1/278 |
| | | 310/156.25 |
| 2017/0040853 A1* | 2/2017 | Totaro ............... H02K 29/03 |

FOREIGN PATENT DOCUMENTS

| | | | | |
|---|---|---|---|---|
| EP | 1501172 A2 * | 1/2005 | ............. | H02K 29/03 |
| EP | 2451049 A1 * | 5/2012 | ............. | H02K 1/276 |

OTHER PUBLICATIONS

International Search Report (PCT/ISA/210) issued in PCT Application No. PCT/EP2019/074971 dated Dec. 17, 2019 with English translation (five pages).

German-language Written Opinion (PCT/ISA/237) issued in PCT Application No. PCT/EP2019/074971 dated Dec. 17, 2019 (six pages).

German-language Office Action issued in German Application No. 10 2018 126 570.0 dated Aug. 7, 2019 (six pages).

\* cited by examiner

ROTOR HAVING SEGMENTS WITH ROTATIONALLY OFFSET MAGNETIC POLES

BACKGROUND AND SUMMARY OF THE INVENTION

The invention relates to a rotor of an electric machine, which rotor has a plurality of segments which are disposed beside one another in the axial direction.

In rotors and stators of electric machines, a torque which leads to a rotation of the rotor is created by a rotating outer magnetic field that is generated by a suitable flow through the stator coils in interaction with the permanent magnets of the rotor. This torque is not constant by virtue of the discrete number of pole pairs and stator teeth. Rather, a uniformity in terms of the rotation (a so-called torque ripple) which is a function of the number of pole pairs and stator teeth is created.

In current electric machines having this mode of construction, the rotors are usually divided into six or more segments of identical type. These segments can in each case be mutually rotated out of position at a specific angle, this being referred to as a rotor skew. On account of the segments being rotated out of position, the torque ripple for each segment is slightly offset in terms of time or phase. In this way, the individual portions are not completely superimposed, which leads to a reduction of the overall ripple.

So-called linear skews can be used herein, in which the skew of the poles of identical polarity runs in a linear manner from a first segment to a last segment. Furthermore, V-shaped skews are known, wherein the profile of the magnetic poles corresponds to a V-shape.

This V-arrangement has the advantage that the oscillating moment is applied so as to be symmetrical in relation to the central plane. It is ensured on account thereof that the first torsional resonance frequency of the rotor is only slightly or not at all excited. This is advantageous because an excitation of the rotor resonance frequency or the torsional resonance frequency, respectively, would lead to a highly dynamic behavior of the electric machine. Such a dynamic behavior in turn has negative effects on the acoustic behavior of the electric machine, that is to say that oscillations and vibrations may be created. While any significant excitation of the first torsional resonance frequency of the rotor is prevented by the V-skew of the rotor, the second torsional resonance frequency is however excited herein.

The invention is therefore based on the object of providing a rotor assembly by way of which not only the excitation of the first torsional resonance frequency but also the excitation of the second torsional resonance frequency can be reduced.

This object is achieved by a rotor of an electric machine according to the independent claim.

The rotor has a plurality of segments which are disposed beside one another in the axial direction, wherein each of the segments has a plurality of magnetic poles which are disposed so as to be coaxial with a rotation axis of the electric machine and uniformly distributed in the circumferential direction of the segment. The number of poles, as well as the angular position thereof on account of the uniform distribution of the poles across the circumference, is a function of a design of the rotor and of the electric machine and may correspondingly vary. Each segment of the rotor has an identical number of poles such that the mutual relative angular position of the poles of a segment on account of the uniform distribution of the poles across the circumference of the segment is also identical in the case of all segments.

In order to now reduce the excitation of the second torsional resonance frequency of the rotor and to thus improve the acoustic behavior of the electric machine, the segments of the rotor, in a manner corresponding to a relative angular position of the magnetic poles in the circumferential direction, are disposed in such a manner that the magnetic poles of adjacent segments which are adjacent to one central segment or a plurality of central segments in a first angular direction are rotated out of position in relation to the magnetic poles of the one central segment or the plurality of central segments, and that the magnetic poles of segments which outwardly adjoin the adjacent segments are rotated out of position in a second angular direction that is counter to the first angular direction. It has been established that this W-shaped or zigzag-shaped skew of the poles excites the first torsional resonance frequency of the motor to a lesser extent than arrangements to date, on the one hand. On the other hand, the W-shaped or zigzag-shaped skew also leads to the second torsional resonance frequency being less excited.

In this way, the momentum of the rotor in the range of the second torsional resonance frequency can be reduced, and the acoustic behavior of the electric machine can thus be improved. It has been established by simulations that relevant acoustic variables can be reduced. For example, the surface acceleration in the frequency range of the second rotor resonance can be reduced by up to 5 dB.

According to one embodiment, the skew of the segments is embodied so as to be axially symmetrical such that the magnetic poles in pairs, in a manner symmetrical in relation to the center, have an identical relative angular position. This means, for example, that the two outermost segments are disposed at the identical relative angular position, the two inwardly following segments are disposed at the identical angular position, etc.

According to one embodiment, the rotor has an even number of segments. The rotor can in particular have six or more, that is to say six, eight, ten, twelve, etc., segments. The two central segments herein can in particular be disposed in an identical manner. This means that the two central segments have the identical relative angular position and are not mutually rotated out of position. In this embodiment, the central peak of the W-shaped or zigzag-shaped skew is thus formed by two segments. Alternatively, the central peak, depending on the number of segments, can also be formed by one segment or more than two segments.

An even number of segments is preferable in order to achieve a symmetrical and balanced state. Balanced here means that the number of segments is identical for each angle. For example, if three different angular positions are chosen and the rotor herein is to be symmetrical and balanced, the number of segments has to be divisible by 2 and 3, that is to say that the rotor can have 6 or 12 segments. On account of this number of segments it is possible for 2 or 4 segments to be located in each angular position.

If the rotor has an odd number of segments, the central peak of the W-shaped or zigzag-shaped skew can be formed by a single segment.

According to one further embodiment, the magnetic poles of two segments disposed beside one another have the identical relative angular position and are not rotated out of position in relation to one another. Segments which are not rotated out of position in relation to one another can thus also be disposed between segments which are rotated out of position in relation to one another in dissimilar angular directions. Alternatively or additionally, the magnetic poles of two segments disposed beside one another can be rotated out of position in the same angular direction, thus form a linear skew. Since these arrangements relate only to individual segments and not to all segments of the rotor, the total number of the segments can be disposed in a W-shaped or zigzag-shaped manner.

According to one further embodiment, the magnetic poles of the one central segment or of the plurality of central segments are rotated out of position in relation to an angular reference position. The angular reference position can in particular be a zero position of the magnetic poles. Alternatively, the magnetic poles of the one central segment or of the plurality of central segments can be disposed in the angular reference position, for example the zero position.

According to one further embodiment, the magnetic poles of further segments following toward the outside are rotated out of position in alternating angular directions. In this way, a plurality of successive W-shaped skews or one long zigzag-shaped skew of the segments can be formed. This enables a particularly positive reduction not only of the first torsional resonance frequency but also of the second torsional resonance frequency. The acoustic behavior of the electric machine can be further improved in this way.

The optimum value for the angle $\alpha$ about which the segments can be rotated out of position in relation to one another in each case or in relation to the reference angle, is a function of the number of segments ($n_S$) and stator teeth ($n_Z$). The segments are preferably rotated out of position by $+\alpha$ and $-\alpha$ in relation to the reference angle or the zero position, respectively. For example, the angle $\alpha$ can be calculated as $$\alpha = \frac{360°}{n_Z \cdot \frac{n_S}{2}}$$

According to one further aspect, the present invention relates to an electric machine having a rotor as described above and a stator. The rotor can be configured as an internal rotor which within a stator is disposed in the radial direction, or as an external rotor which outside the stator is disposed in the radial direction.

Further potential implementations of the invention also comprise combinations of features or embodiments described previously or hereunder in terms of the exemplary embodiment which have not been explicitly mentioned. The person skilled in the art herein will also add individual aspects as improvements or additions to the respective basic form of the invention.

Further advantages and advantageous embodiments are set forth in the description, the drawings, and the claims. The combinations of the features set forth in the description and in the drawings herein are in particular purely exemplary such that the features may also be present individually or in other combinations.

The invention is to be described in more detail hereunder by means of exemplary embodiments illustrated in the drawings. The exemplary embodiments and the combinations shown in the exemplary embodiments herein are purely exemplary and are not intended to limit the scope of protection of the invention. The latter is solely defined by the appended claims.

Identical or functionally equivalent elements are identified with the same reference signs hereunder.

DETAILED DESCRIPTION OF THE DRAWINGS

Figure 1:
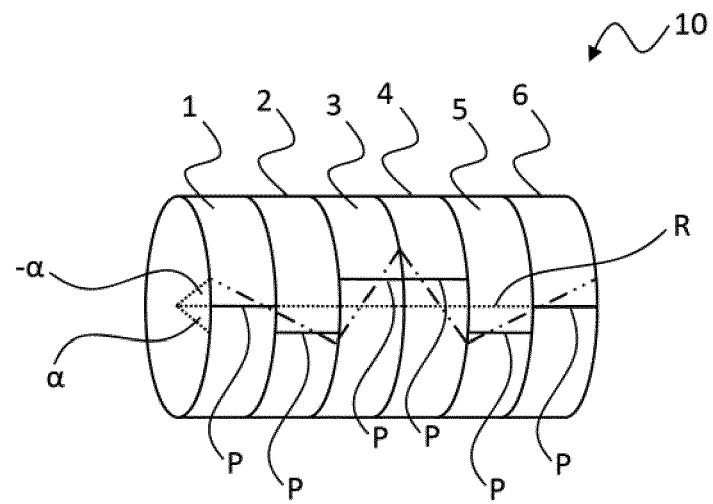
FIG. 1 shows an exemplary arrangement of the segments of a rotor which is composed of six segments.
Figure 2:
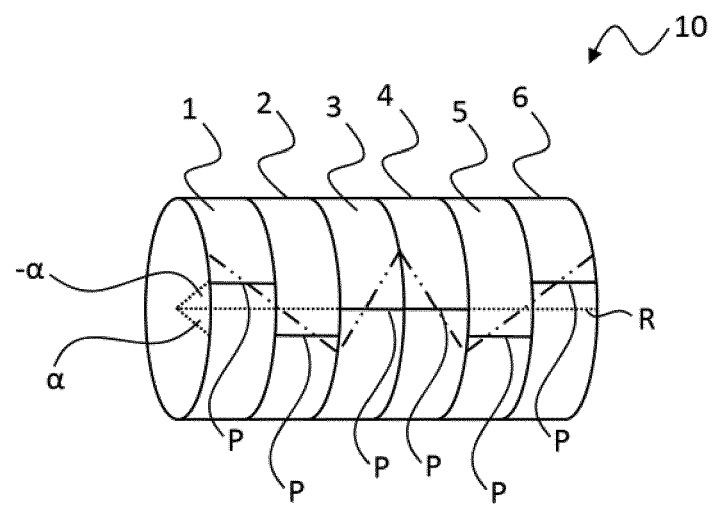
FIG. 2 shows a further exemplary arrangement of the segments of a rotor which is composed of six segments.

FIGS. 1 and 2 show a rotor 10 of an electric machine, which rotor has a plurality of segments 1 to 6 which are disposed adjacent one another in an axial direction. However, the rotor 10 may also have more or fewer segments, as is illustrated in an exemplary manner in FIGS. 5 to 7 and is explained in more detail hereunder.

As is shown in FIGS. 1 and 2, the segments 1 to 6 are disposed in such a manner that the magnetic poles P of the segments 2, 5 adjacent to the two central segments 3, 4 are rotated out of position in a first angular direction in relation to the magnetic poles P of the central segments 3, 4, and that the magnetic poles P of outwardly following segments 1, 6 are rotated out of position in a second angular direction, counter to the first angular direction, in relation to the magnetic poles P of the segments 2, 5. In a rotor 10 which is composed of six segments 1 to 6, this leads to a W-shaped skew of the magnetic poles P of the segments 1, . . . 6.

Each of the segments 1 to 6 has a plurality of magnetic poles P which are disposed so as to be coaxial with a rotation axis of the electric machine and uniformly distributed in the circumferential direction of the segment 1, . . . 6. For the sake of clarity, one pole P is shown as a reference pole for each segment 1, . . . , 6.

In the operation of the rotor 10, an excitation of the first and the second torsional resonance frequency of the rotor 10 can arise by virtue of the rotation of the latter. These torsional resonance frequencies are schematically indicated in FIGS. 3 (first torsional resonance frequency) and 4 (second torsional resonance frequency).

A torque which leads to a rotation of the rotor 10 is created by a rotating outer magnetic field that is generated by energizing the stator coils in interaction with the poles P of the rotor 10. This rotation in FIGS. 3 and 4 is in each case indicated by the arrows. Torsioning of the rotor 10 and torsional resonance frequencies associated therewith which lead to an acoustically perceptive behavior of the rotor 10 are created on account of the rotation.

Figure 3:
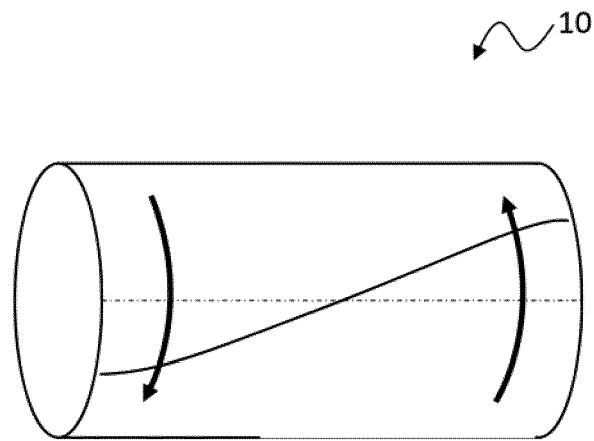
FIG. 3 shows a schematic illustration of the first torsional resonance frequency of a rotor.
Figure 4:
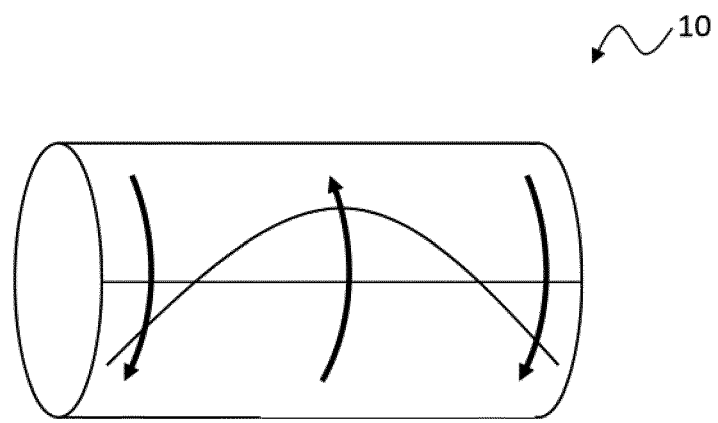
FIG. 4 shows an illustration of the second torsional resonance frequency of a rotor.

The first torsional resonance frequency which in FIG. 3 is indicated by the curve, can be reduced or prevented by a V-skew of the segments 1, . . . 6, since such a V-skew slightly offsets the torque ripple of the segments in terms of time or phase (and does not follow the profile of the torsional resonance frequency). The individual proportions of the segments are thus not completely superimposed, and the first torsional resonance frequency can be reduced.

However, the second torsional resonance frequency which in FIG. 4 is indicated by the curve is not reduced by a V-skew. The rotation of the segments out of position in a V-arrangement rather follows the second torsional resonance frequency and could even amplify the latter.

In order to not only reduce the first torsional resonance frequency of the rotor 10, as can be achieved by a V-shaped skew, but in order to also reduce the second torsional resonance frequency of the rotor 10, the segments 1, . . . , 6 in FIGS. 1 and 2 in a manner corresponding to a relative angular position of the magnetic poles P in the circumferential direction are disposed in such a manner that the magnetic poles P of the segments 1 to 6 result in a W-shaped skew. It has been established in experiments that such a W-shaped skew, or in the case of more than six segments, a zigzag-shaped skew, is particularly advantageous to at least reduce and preferably not excite the second torsional resonance frequency in addition to the first torsional resonance frequency of the rotor 10.

The W-shaped arrangement of the segments 1, . . . , 6 in FIGS. 1 and 2 is shown in exemplary arrangements, wherein the rotor 10 has in each case six segments 1, . . . , 6. However, it is to be noted that other arrangements which form a W-shaped skew of this type are also possible. In particular, the rotor 10 may also have more or fewer than the six segments 1, . . . , 6 shown. For example, the rotor 10 can have twelve segments which are assembled from the six segments shown in FIGS. 1 and 2.

In one preferred embodiment, as is illustrated in FIGS. 1 and 2, the rotor 10 has an even number of segments 1 to 6, wherein the two central segments 3, 4 have the identical relative angular position and are not mutually offset.

FIG. 1 shows a first arrangement of the segments 1 to 6 in order to achieve a W-shaped skew. In this case, the segments 1 and 6 are disposed in an angular reference position R. The segments 2 and 5 are rotated out of position by an angle α in relation to the segments 1 and 6. The segments 3 and 4 are rotated out of position by an angle −α in relation to the segments 1 and 6.

A further potential arrangement is shown in FIG. 2. In this case, the two central segments 3 and 4 are located in the angular reference position, or the zero position R, respectively, and the outer segments 1, 2, 5, 6 are rotated out of position in relation to the segments 3 and 4. This means that the segments 2 and 5 are rotated out of position by an angle α in relation to the segments 3 and 4. The segments 1 and 6 are rotated out of position by an angle −α in relation to the segments 3 and 4.

A peak of the W of the skew is configured by the two central segments 3 and 4 in the two exemplary embodiments of FIGS. 1 and 2. This means that the two central segments 3, 4 are in each case offset by an angle in relation to the two adjacent segments 2, 5. On account of this arrangement, the excitation of the second torsional resonance frequency can also be reduced in comparison to a V-shaped arrangement.

Alternatively, the arrangement of the segments 1 to 6 can also take place in a mirror-inverted manner, that is to say in an M-shaped manner. Furthermore, the segments 1, . . . , 6 of the rotor 10 can be disposed in such a manner that a plurality of W-shaped skews are formed in succession in the axial direction, or that other skews or linear arrangements adjoin the W-shaped skew. The acoustic behavior of the electric machine can be further improved in this way.

Figure 5:
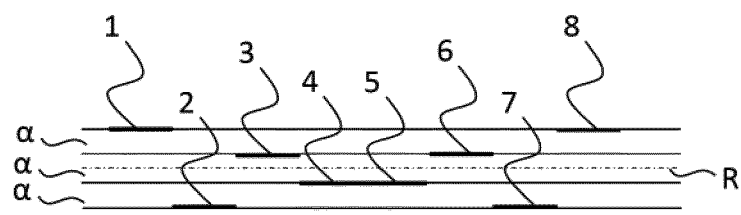
FIG. 5 shows a simplified exemplary arrangement of the segments of a rotor which is composed of eight segments.
Figure 6:
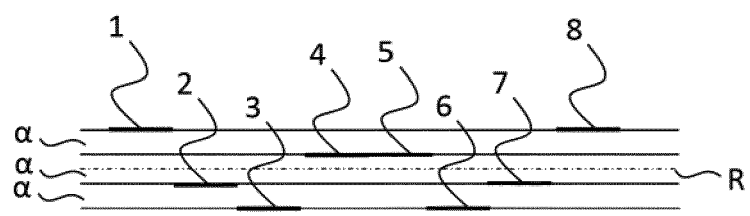
FIG. 6 shows a further simplified exemplary arrangement of the segments of a rotor which is composed of eight segments.
Figure 7:
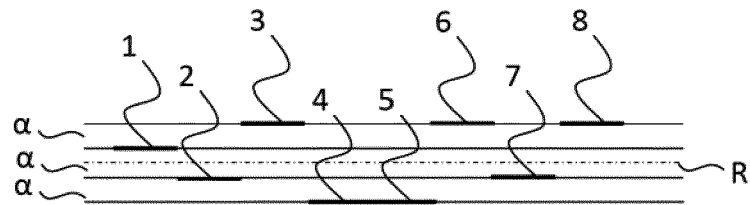
FIG. 7 shows a further simplified exemplary arrangement of the segments of a rotor which is composed of eight segments.

For example, if the rotor 10 has eight segments 1 to 8, the segments 1 to 8 cannot only be disposed in a W-shaped skew (FIG. 6) but also be disposed in a zigzag line, for example, as is shown in an exemplary manner in FIGS. 5 and 7. FIGS. 5 to 7 herein illustrate in each case a simplified view of the segments 1 to 8 of a rotor 10, wherein the respective poles are identified by the numerals of the segments.

The inner segments 4 and 5 in FIG. 5 are rotated out of position in a first angular direction in relation to the angular reference position R. The adjoining segments 3 and 6 are rotated out of position in a second, opposite, angular direction in relation to the angular reference position R. The segments 2 and 7 in turn are rotated out of position in the first angular direction in relation to the angular reference position R. The outermost segments 1 and 8 are again rotated out of position in the second, opposite, angular direction in relation to the angular reference position R. This leads to a zigzag-shaped arrangement of the segments 1 to 8 which can be continued in an arbitrary manner toward the outside. In this way, more than eight segments can also be disposed in such a manner that the second torsional resonance frequency is not excited.

FIG. 6 shows that it is also possible for a linear skew to be performed between several segments. This here is the case between the segments 1 to 3 and 6 to 8, for example. However, since a W-shaped skew across the entire length of the rotor 10 is also achieved in this case, the second torsional resonance frequency is also not excited here.

FIG. 7 shows a further potential arrangement of the segments 1 to 8 of a rotor 10. Here, the inner segments 4 and 5 are rotated out of position in the first angular direction in relation to the angular reference position R as in FIG. 5 but about a larger angle. The adjoining segments 3 and 5 are likewise rotated out of position again in the second, opposite, angular direction in relation to the angular reference position R, wherein the angle here is likewise larger than in FIG. 5. The segments 2 and 7 are again rotated out of position in the first angular direction in relation to the angular reference position R, wherein the angle again comes close to the angular reference position R. The outermost segments 1 and 8 are again rotated out of position in the second, opposite, angular direction in relation to the angular reference position R, wherein the angle here again also comes close to the angular reference position R. This arrangement can likewise be continued in an arbitrary manner toward the outside.

Many further arrangements are possible in addition to the arrangement shown here. In any case, it is achieved by the arrangement of the segments that the rotation of the segments out of position does not follow the second torsional resonance frequency and thus does not amplify the latter but reduces or even prevents the excitation of the second torsional resonance frequency.

On account of the W-shaped or zigzag-shaped rotor skew described here, it is therefore possible to also reduce the excitation of the second torsional resonance frequency in addition to reducing the excitation of the first torsional resonance frequency of the rotor. The acoustic behavior of the electric machine can be improved in this way.

LIST OF REFERENCE SIGNS 1-8 Segment
Rotor
P Magnetic pole
R Angular reference position
α Angle

What is claimed is:
1. A rotor of an electric machine, comprising:
a plurality of segments arranged adjacent one another in an axial direction, wherein
each of the segments has a plurality of magnetic poles which are arranged coaxially with a rotation axis of the electric machine and uniformly distributed in a circumferential direction of the segment, the segments are arranged in the circumferential direction such that the magnetic poles of adjacent segments, which are adjacent to one or more central segments, are rotationally offset in a first angular direction in relation to the magnetic poles of the one or more central segments, the magnetic poles of segments which outwardly adjoin the adjacent segments are rotationally offset in a second angular direction that is counter to the first angular direction, and the magnetic poles are arranged in three or more different angular positions.

2. The rotor according to claim 1, wherein
the segments are arranged in the circumferential direction such that the magnetic poles of the segments result in a W-shaped skew.

3. The rotor according to claim 1, wherein
the segments are arranged in the circumferential direction such that the magnetic poles of the segments result in a zigzag-shaped skew.

4. The rotor according to claim 2, wherein
the skew of the segments is embodied so as to be axially symmetrical such that the magnetic poles in pairs have an identical relative angular position in a manner symmetrical in relation to a center.

5. The rotor according to claim 3, wherein
the skew of the segments is embodied so as to be axially symmetrical such that the magnetic poles in pairs have an identical relative angular position in a manner symmetrical in relation to a center.

6. The rotor according to claim 1, wherein
the rotor has an even number of segments.

7. The rotor according to claim 5, wherein
two central segments have an identical relative angular position and are not mutually offset.

8. The rotor according to claim 1, wherein
the magnetic poles of two segments arranged adjacent one another have an identical relative angular position and are not mutually offset or rotated out of position in the same angular direction.

9. The rotor according to claim 1, wherein
the magnetic poles of the one or more central segments are rotated out of position in relation to an angular reference position.

10. The rotor according to claim 1, wherein
the magnetic poles of the one or more central segments are disposed in an angular reference position.

11. The rotor according to claim 9, wherein
the magnetic poles of further segments following toward the outside are rotated out of position in alternating angular directions.

12. The rotor according to claim 10, wherein
the magnetic poles of further segments following toward the outside are rotated out of position in alternating angular directions.

* * * * *